United States Patent [19]
Hoenig et al.

[11] Patent Number: 5,900,035
[45] Date of Patent: May 4, 1999

[54] GLASS FORMING MACHINE BLANK MOLD COOLING APPARATUS

[75] Inventors: Russell D. Hoenig, Summerville; John E. Rummel, Jr., Clarion, both of Pa.

[73] Assignee: Owens-Brockway Glass Container Inc., Toledo, Ohio

[21] Appl. No.: 08/907,931

[22] Filed: Aug. 11, 1997

[51] Int. Cl.⁶ .............................. C03B 11/12; C03B 9/38; B29C 49/64
[52] U.S. Cl. ................................ 65/319; 65/355; 65/356; 65/361; 65/68; 65/83; 425/526
[58] Field of Search .................................. 65/68, 72, 76, 65/79, 80, 82, 83, 110, 207, 223, 226, 227, 229, 261, 319, 355, 356, 361; 249/79; 425/526, 525

[56] References Cited

U.S. PATENT DOCUMENTS

| | | |
|---|---|---|
| 1,633,028 | 6/1927 | La France . |
| 2,485,836 | 10/1949 | MacConnell, Jr. . |
| 2,688,823 | 9/1954 | Weber . |
| 2,928,214 | 3/1960 | Mumford . |
| 3,024,571 | 3/1962 | Abbott et al. . |
| 3,094,404 | 6/1963 | Lauck . |
| 3,133,807 | 5/1964 | Denman et al. . |
| 3,137,560 | 6/1964 | Ketcham . |
| 3,231,355 | 1/1966 | Donnelly . |
| 3,241,941 | 3/1966 | Abbott et al. . |
| 3,338,699 | 8/1967 | Colchagoff et al. . |
| 3,580,712 | 5/1971 | Mumford . |
| 3,586,491 | 6/1971 | Mennitt . |
| 3,617,233 | 11/1971 | Mumford . |
| 3,653,870 | 4/1972 | Foster et al. . |
| 3,888,647 | 6/1975 | Breeden et al. . |
| 4,070,174 | 1/1978 | Nebelung et al. . |
| 4,659,357 | 4/1987 | Doud . |
| 4,783,212 | 11/1988 | Loffler . |
| 4,983,203 | 1/1991 | Erb et al. . |
| 5,358,542 | 10/1994 | Johnson et al. . |
| 5,516,352 | 5/1996 | Bogert et al. . |

FOREIGN PATENT DOCUMENTS

| | | |
|---|---|---|
| 0 059 574 | 9/1982 | European Pat. Off. . |
| 0 819 654 A2 | 1/1998 | European Pat. Off. . |

*Primary Examiner*—Steven P. Griffin

[57] ABSTRACT

A hollow parison (P) of a glass container is formed from a gob of molten glass, the parison having a body portion (B) with a closed end and an open end. The body portion of the parison is formed in an annular blank mold (14). The parison also has a finish portion (F) at the open end of the body portion of the parison, the finish portion being formed by an annular neck mold (16) which is positioned against an end of the blank mold during the forming of the parison. An annular cage (26) surrounds a substantial axially extending portion of the blank mold. The annular cage receives cooling air and directs cooling air against cooling fins (24) on the exterior of the blank mold to cool the body portion of the parison while it is in the blank mold. Spent cooling fluid from the annular cage flows therefrom through an opening aligned with the open end of the body portion of the parison. The annular cage is axially slideable along the longitudinal central axis of the blank mold with respect to the blank mold and is biased away from the annular neck mold by a compression spring (32) that is trapped between an annular pressure plate (34) and a portion of the annular cage. Cooling air exiting from the opening in the annular cage is caused to flow past the annular neck mold to assist in cooling the finish portion of the parison by an annular skirt (36) that is positioned below the annular pressure plate toward the annular neck mold.

5 Claims, 2 Drawing Sheets

GLASS FORMING MACHINE BLANK MOLD COOLING APPARATUS

BACKGROUND OF THE INVENTION

1. Field of the Invention

This invention relates to a method of and apparatus for cooling a molten glass parison in a blank mold of a forming machine of the individual section ("I.S.") type. More particularly, this invention relates to a method of and apparatus for cooling the finish portion of a molten glass parison while it is positioned in such a blank mold.

2. Description of the Prior Art

Hollow glass articles, such as bottles and jars, when molded by a forming machine of the I.S. type, are molded in two steps. In the first step, a preform of the finished container, namely an article with a closed end and an open end, which is usually called a blank or a parison, is molded by an annular mold that is made up of a pair of mating blank mold sections. Upon the completion of the blank molding step, the blank mold sections separate, and the blank or parison is transferred to another mold station, often called the blow mold station, where it is blown into its final shape by another annular mold that is made up of another mating pair of mold sections. At the conclusion of the blow mold process, the mating sections of the blow mold are separated, and the container is removed from the forming machine for further processing.

The glass gob that is formed into a parison in the blank mold of an I.S. machine is sufficiently hot to be capable of being shaped into a parison and, thus, possesses a high level of latent heat. Much of this heat must be removed before the container is removed from the blow mold of the forming machine, however, so that the finished container will be sufficiently rigid to undergo further processing without any further change in its shape. Thus, much heat must be removed from the container being formed, both during the blank molding step and the blow molding step, and unless the heat is removed at a rapid rate, the productivity of the forming machine is unduly limited.

The problem of heat removal from the molds of an I.S. forming machine at a suitable rate is especially important at the blank mold station because the surface area of the parison is quite small due to the small diameter of the parison, which limits the rate at which heat can be removed, and the amount of heat to be removed is quite high due to the larger wall thicknesses of the parison in comparison to the wall thicknesses of a finished container.

An approach to the cooling of parisons at a blank mold station of an I.S. machine is disclosed in U.S. Pat. No. 3,580,712 (Mumford), the disclosure of which is incorporated by reference herein. The process described in the '712 patent is occasionally referred to as the "41 Process."

A parison that is formed in a blank mold of an I.S. machine has a body portion and a "finish" portion. The finish portion is the portion of the parison that is immediately below the rim at the open end of the parison, and the finish portion is usually molded into a threaded or otherwise configured closure-receiving configuration by a mating pair of neck mold elements that are positioned adjacent to the blank mold elements at the blank mold station during the forming of the parison. The arrangement of the aforesaid '712 patent, which serves to cool the body portion of a parison by directing cooling air against the exterior of the blank mold sections, is not as effective in cooling the finish portion of the parison because the neck mold elements are not exposed to contact by cooling air as are the blank mold elements. Thus, in arrangements similar to those of the '712 patent, cooling of the finish portion occurs mainly by conduction of heat from the neck mold elements to the blank mold elements rather than by convection to a stream of cooling air. Neck mold cooling by such an arrangement is somewhat slower than the blank mold cooling that results therefrom, and, unless the removal of the parison from the blank mold station is somewhat delayed, this will lead to some imprecision in the dimensions of the finish portion of the parison due to temperature differences between the finish portion and the body portion of the parison. Problems relating to the cooling of the neck mold elements at a blank mold station of an I.S. glass forming machine are addressed in U.S. Pat. Nos. 5,516,352 (Bogert et al.), 5,358,542 (Johnson et al.) and 4,659,357 (Doud). However, the arrangements of these references are complex and require much additional structure for the implementation of the cooling processes described therein.

SUMMARY OF THE INVENTION

According to the present invention there is provided a method of and apparatus for increasing the rate at which heat is removed from the finish portion of a parison in a blank mold of an I.S. machine in comparison to prior art blank mold cooling arrangements, and of doing so without requiring significant amounts of additional structure to structure otherwise required at the blank mold station. As in known blank mold cooling arrangements, the body portion of the parison is cooled by directing cooling air from a cage that surrounds the blank mold elements against the exteriors of the blank mold elements. Instead of exhausting spent cooling air after it flows out of contact with the blank mold elements in such prior art mold cooling arrangements, however, according to the present invention the spent cooling air, which still retains ample cooling capacity, is diverted and caused to flow past the exteriors of the neck mold elements, to thereby increase the rate at which heat is transferred away from the finish portion of the parison in relation to the rate at which it would otherwise be transferred mainly by conduction from the neck mold elements to the blank mold elements.

Accordingly, it is an object of the present invention to provide an improved method of and apparatus for cooling a parison of molten glass in a blank mold of a glass container forming machine. More particularly, it is an object of the present invention to provide a method and apparatus of the character described for increasing the rate at which heat is transferred away from a finish portion of the parison.

For a further understanding of the present invention and the objects thereof, attention is directed to the drawing and the following brief description thereof, to the detailed description of the preferred embodiment and to the appended claims.

IN THE DRAWING

FIG. 1 is a fragmentary plan view of a portion of a glass container forming machine incorporating blank mold cooling apparatus according to the preferred embodiment of the present invention; and FIG. 2 is a sectional of view taken on line 2—2 of FIG. 1.

DETAILED DESCRIPTION OF THE PREFERRED EMBODIMENT

Figure 1:
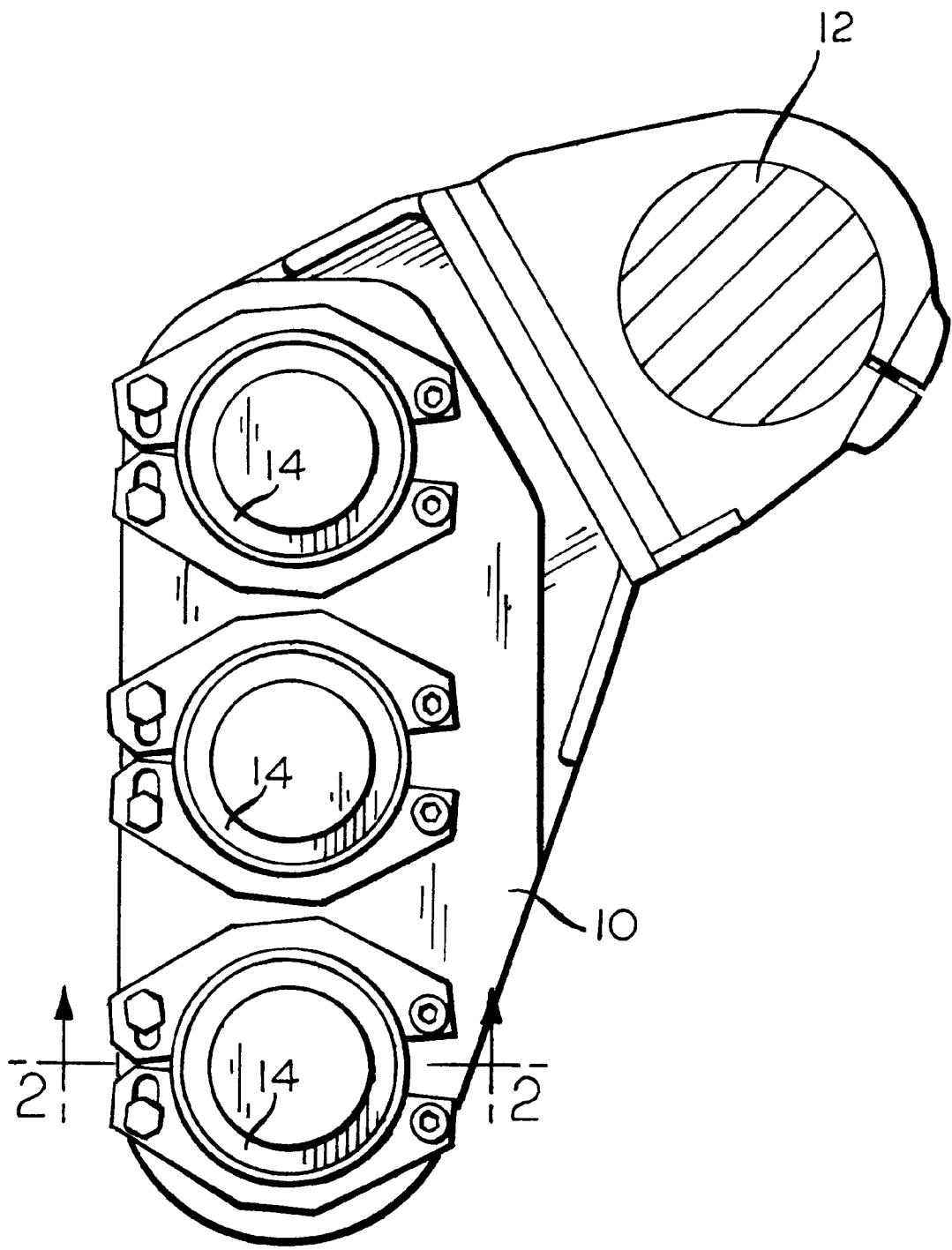

FIG. 1 illustrates a blank mold support arm 10 of a glass container forming machine of the individual section ("I.S.")

type, the support arm 10 extending generally horizontally and being supported from a vertically extending support shaft 12. The support arm 10 supports one or more blank molds 14, shown as three such molds, as required for the manufacture of glass containers by an I.S. machine according to the triple gob process, a process in which three containers are simultaneously manufactured at each machine section. Of course, it is also contemplated that a different number of such blank molds 14 can be employed, for example, two such molds for an I.S. machine used to form two containers at a time according to the double gob process or four such molds for an I.S. machine used to form four containers at a time according to the quad process, as is known in the art.

Figure 2:
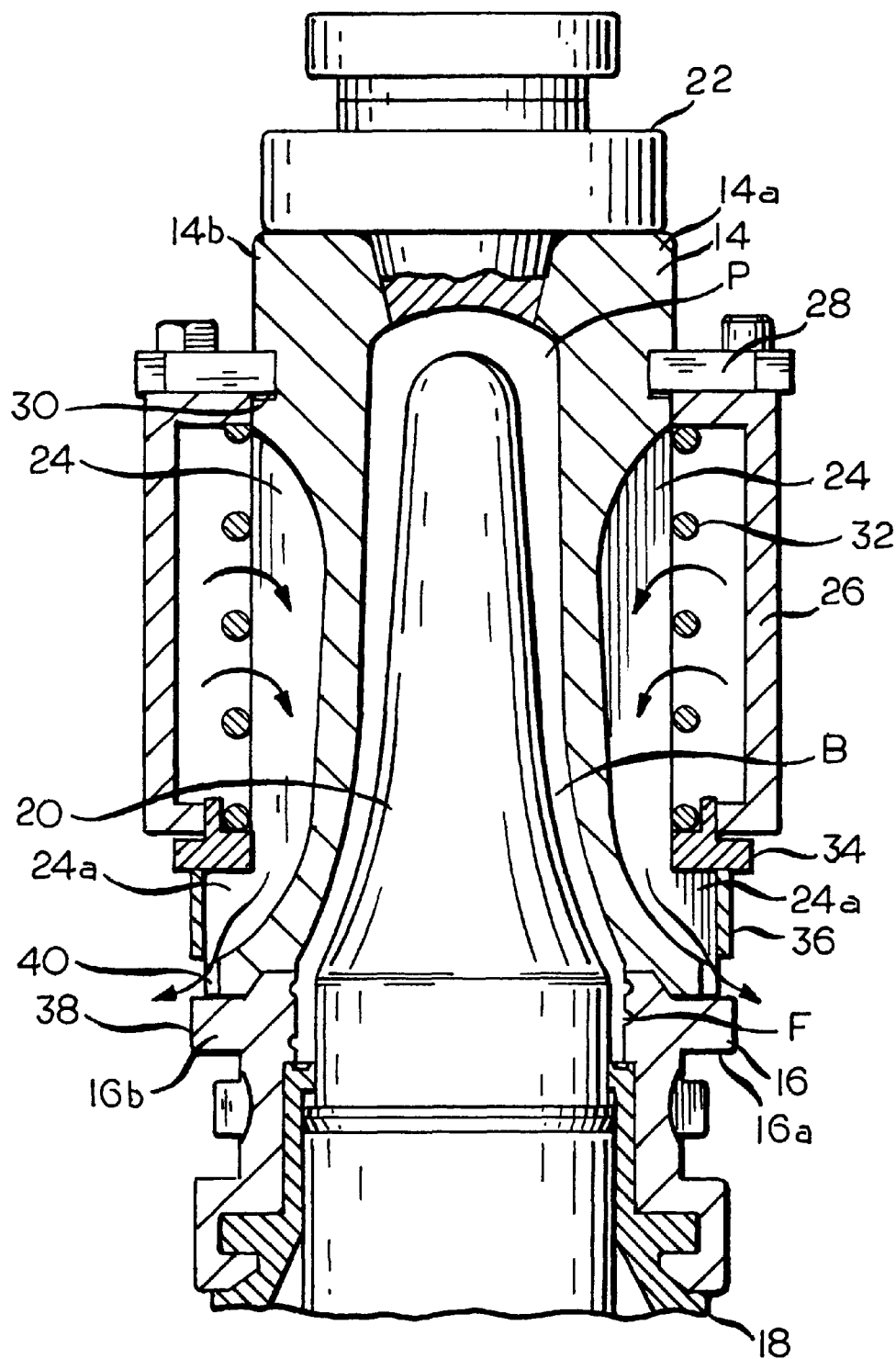

As is shown in FIG. 2, each blank mold 14 is used to form a parison P from a gob of molten glass, the parison P having a body portion B that is surrounded by the blank mold 14 and a finish portion F that is positioned beyond the extent of the body portion B. As shown, the parison P is molded in an inverted position, from the position it is intended to occupy after a container is formed therefrom, that is, with its finish portion F below its body portion B. In any case, the body portion B has a closed end away from the finish portion F, and the finish portion F, which is externally threaded or otherwise configured to receive a closure, is formed by a neck mold 16, which is occasionally referred to as a neck ring. In that regard, the blank mold 14 is made up of a mating pair of semi-cylindrical mold elements 14a, 14b, which are joined end to end during the molding of the parison P, but which are separated after the molding of the parison P is completed to permit the parison P to be removed from the blank mold 14. Likewise, the neck mold 16 is made up of a mating pair of semi-cylindrical neck mold elements 16a, 16b, which are joined end to end during the molding of the parison P. The neck mold elements 16a, 16b are carried by an invert arm 18, which transfers the parison P while it is carried by the neck mold 16 in its closed condition to a blow mold station, (not shown), by a 180° turning motion in a vertical plane, after the blank mold 14 has been opened to permit the parison P to be removed therefrom, as is also known in the art.

In the embodiment illustrated in FIG. 2, the parison P is formed by pressing in a process as known as the press and blow process, and to that end a reciprocating plunger 20 is provided to move into the blank mold 14, through the neck mold 16, to provide the parison P with its illustrated shape as is known in the art. As is also known in the art, however, parisons can also be formed without the use of a reciprocating plunger corresponding to the plunger 20 by blowing in a process known as the blow and blow process, a process that also requires a neck mold corresponding to the neck mold 16 to form a finish portion F of an otherwise blown parison, and the present invention is also considered to be applicable to parisons formed by the blow and blow process. Under either the press and blow process or the blow and blow process, the upper end of the neck mold 14 is open to receive a gob of molten glass, and is thereafter closed by a baffle 22 to permit the closed end of the parison P to be properly formed during pressing or blowing.

The blank mold element 14b is provided with a plurality of circumerentially thin cooling fins 24 extending radially from the exterior thereof, the cooling fins 24 being spaced apart in a circumferential array. The cooling fins 24 extend over a substantial portion of the vertical extent of the body portion B of the parison P and serve to help the blank mold element 14b to transfer heat away from the body portion B while the parison P is still surrounded by the blank mold 14.

In that regard, the parison P must cool in the blank mold 14 somewhat from its forming temperature so that it will be self-supporting during its transfer to the blow mold, and not lose its desired to shape during such transfer step. The cooling of the body portion B of the parison P is enhanced by circulating cooling air past the cooling fins 24, and to that end the blank mold 14 is surrounded by an annular cage 26 that receives cooling air from a source (not shown) and directs the cooling air against and between the cooling fins 24 to flow outwardly from the cage 26 through an opening at the bottom thereof. To permit proper seating of the blank mold 14 with respect to the neck mold 16, the cage 26 is secured to the blank mold 14 to permit some relative vertical movement therebetween, and to that end a radially inwardly projecting key 28 is affixed to the cage 26 and is received in a radially outwardly facing recess 30 in the blank mold 14. The recess 30 has a vertical extent that is somewhat greater than the thickness of the key 28, and the cage 26 is resiliently biased toward the upper extent of the recess 30 by a compression spring 32. The bottom of the compression spring 32 is restrained by a pressure plate 34, which is biased against a vertically extending shoulders 24a of each of the cooling fins 24, the shoulders 24a of the cooling fins 24 preferably being aligned with one another in a horizontal plane.

To assist in the cooling of the finish portion F of the parison P while the parison P is in place in the blank mold 14, a downwardly depending skirt 36 is provided against the position of the cooling fins 24 below the shoulders 24a, immediately below the pressure plate 34, to direct cooling air exiting from the cage 26, which still has substantial cooling capacity, downwardly past a radially outwardly projecting annular portion 38 of the neck mold 16. To that end, if required, a radially outermost and lowermost portion of the blank mold 14 is interrupted at 40 to further direct cooling air from the cage 26 past the annular portion 38 of the neck mold 16. In this way, the rate of cooling of the finish portion F of the parison P will be increased so that the transfer of the parison P from the neck mold 14 to the blow mold need not be unduly delayed in order to ensure that the finish portion F is suitably cool to be dimensionally stable during the transfer step and during the blowing of a container from the parison P.

Although the best mode contemplated by the inventors for carrying out the present invention as of the filing date hereof has been shown and described herein, it will be apparent to those skilled in the art that suitable modifications, variations and equivalents may be made without departing from the scope of the invention, such scope being limited solely by the terms of the following claims and the legal equivalents thereof.

What is claimed is:

1. An apparatus for molding a parison of a glass container from a gob of molten glass, said parison having an exterior, said apparatus comprising:

annular mold means having an internal cavity for forming the exterior of a body portion of the parison, the body portion having a closed end and an open end;

annular neck mold means having an internal cavity for molding a finish portion of the parison, said annular neck mold means being positioned adjacent to said annular mold means during the molding of the parison to form the finish portion of the parison adjacent to the open end of the body portion of the parison;

means for forming an internal cavity in the body portion of the parison and an opening extending through the finish portion of the parison;

an annular cage surrounding a substantial portion of the annular mold means and surrounding no portion of the annular neck mold means, said annular cage being constructed and arranged to receive a stream of cooling fluid and to distribute said cooling fluid against an exterior of the annular mold means to cool at least the body portion of the parison; and means for causing spent cooling fluid from the annular cage to flow in an annular pattern past at least a portion of the annular neck mold means to assist in cooling the finish portion of the parison;

wherein said means for causing spent cooling fluid to flow from the annular cage comprises;

an annular skirt positioned below said annular cage to cause the spent cooling fluid to flow in an annular pattern past at least a portion of the annular neck mold means.

2. An apparatus according to claim 1 and further comprising:

means for positioning said annular cage with respect to said annular mold means to permit relative movement between said annular cage and said annular mold means along a longitudinal central axis of said annular mold means.

3. An apparatus according to claim 2 wherein said means for positioning comprises:

an annular pressure plate fixedly positioned with respect to said annular mold means, said annular cage being movable with respect to said annular pressure plate; and compression spring means surrounding said annular mold means and trapped between said annular pressure plate and a portion of said annular cage for biasing said annular cage to a position away from said annular pressure plate.

4. An apparatus according to claim 1 wherein said means for forming an internal cavity comprises a reciprocating plunger, said reciprocating plunger being constructed and arranged to extend through said annular neck mold means and into said annular mold means.

5. An apparatus for molding a parison of a glass container from a gob of molten glass, said parison having an exterior, said apparatus comprising:

annular mold means having an internal cavity for forming the exterior of a body portion of the parison, the body portion having a closed end and an open end;

annular neck mold means having an internal cavity for molding a finish portion of the parison, said annular neck mold means being positioned adjacent to said annular mold means during the molding of the parison to form the finish portion of the parison adjacent to the open end of the body portion of the parison;

means for forming an internal cavity in the body portion of the parison and an opening extending through the finish portion of the parison;

an annular cage surrounding a substantial portion of the annular mold means and surrounding no portion of the annular neck mold means, said annular cage being constructed and arranged to receive a stream of cooling fluid and to distribute cooling fluid against an exterior of the annular mold means to cool at least the body portion of the parison;

means for causing spent cooling fluid from the annular cage to flow in an annular pattern past at least a portion of the annular neck mold means to assist in cooling the finish portion of the parison;

means for positioning said annular cage with respect to said annular mold means to permit relative movement between said annular cage and said annular mold means along a longitudinal central axis of said annular mold means;

said means for positioning comprising:

an annular pressure plate fixedly positioned with respect to said annular mold means, said annular cage being movable with respect to said annular pressure plate; and compression spring means surrounding said annular mold means and trapped between said annular pressure plate and a portion of said annular cage for biasing said annular cage to a position away from said annular pressure plate; and wherein an exterior of said annular cage defines an opening for cooling fluid to flow from said annular cage at a location near the open end of the body portion of the parison; and wherein said means for causing spent cooling fluid to flow from the annular cage comprises;

an annular skirt positioned below said pressure plate into said opening to cause the spent cooling fluid to flow in an annular pattern past at least a portion of the annular neck mold means.

* * * * *